(No Model.)
G. FLOWER.
LAMP BURNER FOR HEAVY OILS.
No. 267,511. Patented Nov. 14, 1882.
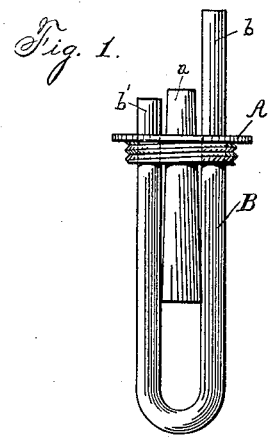
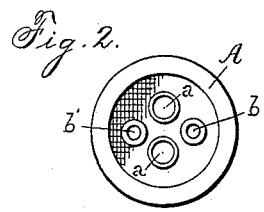
WITNESSES
Samuel E. Thomas
J. Edward Warren
INVENTOR
George Flower
By W. W. Leggett
Attorney

UNITED STATES PATENT OFFICE.

GEORGE FLOWER, OF DETROIT, MICHIGAN.

LAMP-BURNER FOR HEAVY OILS.

SPECIFICATION forming part of Letters Patent No. 267,511, dated November 14, 1882.

Application filed September 5, 1882. (No model.)

*To all whom it may concern:*

Be it known that I, GEORGE FLOWER, of Detroit, county of Wayne, State of Michigan, have invented a new and useful Improvement in Lamp-Burners for Heavy Oils; and I declare the following to be a full, clear, and exact description of the same, such as will enable others skilled in the art to which it pertains to make and use it, reference being had to the accompanying drawings, which form a part of this specification.

My invention consists in the combinations of devices and appliances hereinafter specified, and more particularly pointed out in the claims.

In the drawings, Figure 1 is a side elevation of an apparatus embodying my invention. Fig. 2 is a plan view.

Heretofore much difficulty has been experienced in the use of lard-oil or other similar lamps and lanterns much used for signal lights and other purposes, from the fact that in cold weather the lard or analogous oil becomes solidified, and the light in consequence is either dim or becomes extinguished. It has been found desirable to provide some means by which said oil can be kept warm enough to suitably supply the wick and properly maintain the light. Much trouble has been occasioned to overcome the difficulty mentioned, and keep said lamps and lanterns in running order.

It is the object of my invention to remedy this difficulty and supply means in said lamps and lanterns by which said oil shall be kept in a proper state for a continuous supply of the same to the wick as may be required. I accomplish this result by constructing the burners of said lamps and lanterns with one or more tubes adapted to carry the heat from the flame down through said oil, and thus keep it in a proper state.

In carrying out my invention, A is any suitable burner for lard or analogous oil lamps, provided with ordinary wick-tubes, *a*.

B is a tube adapted to extend down into the oil, preferably constructed with one of its ends, *b*, extended upward to the flame in such a manner that the air at the mouth of said end will be constantly fed to the flame. By this means the air is more rarefied in the tube at that point, whereby a current of air is occasioned in said tube, the heated air entering the shorter end of said tube at *b'*, and passing down through the tube and out at *b*. By means of this current of heated air sent through said tube the oil is kept properly heated for use.

It is evident that in lamps and lanterns of different sizes one or more of said tubes for the passage of heated air through the oil may be used, as may be desired.

What I claim is—

1. The combination, with a burner for a lamp or lantern, of a tube located in close proximity to the burner and heated by the flame thereof, said tube and heated air therein passing through the oil for the purpose of heating the same, substantially as and for the purpose described.

2. The combination, with a burner for a lamp or lantern, of a tube located in close proximity to the burner and heated by the flame thereof, said tube being provided with an extension, *b*, projecting above the burner, and the tube and heated air therein passing through the oil for the purpose of heating the same, substantially as and for the purpose described.

3. The combination, with a burner for a lamp or lantern, of a tube for conveying heat to the oil in the oil-chamber, the free ends of said tube embracing the burner while its bend is in the oil-chamber, substantially as described.

In testimony whereof I sign this specification in the presence of two witnesses.

GEORGE FLOWER.

Witnesses:
WILLIAM F. FORD,
J. EDWARD WARREN.